Sept. 8, 1931. E. P. BULLARD 1,822,514
TOOL CLAMPING MEANS
Filed May 1, 1930
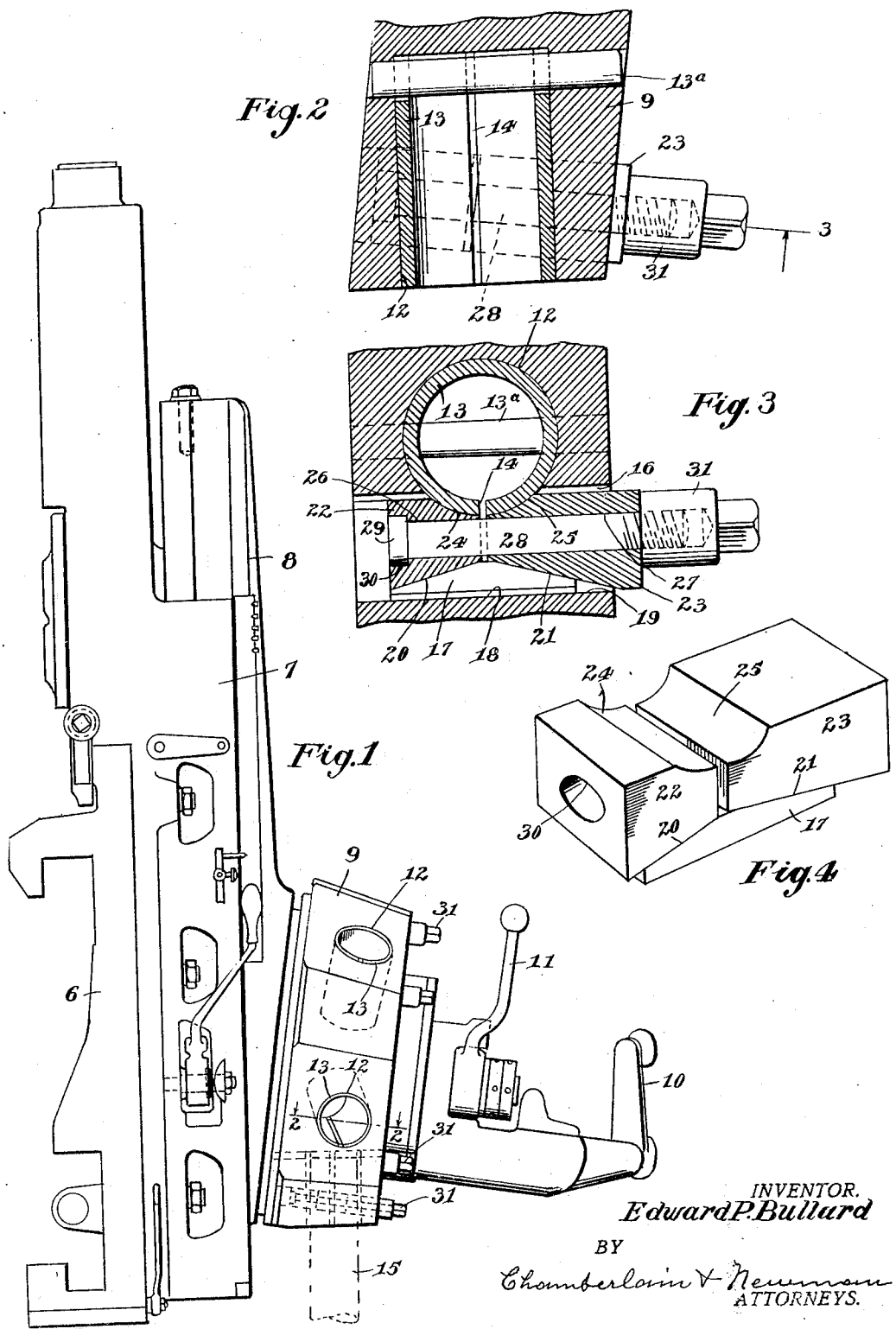
INVENTOR.
Edward P. Bullard
BY
Chamberlain & Newman
ATTORNEYS.

Patented Sept. 8, 1931

1,822,514

UNITED STATES PATENT OFFICE

EDWARD P. BULLARD, OF FAIRFIELD, CONNECTICUT

TOOL CLAMPING MEANS

Application filed May 1, 1930. Serial No. 448,943.

This invention relates to tool holders and more particularly to improved clamping means for securing tools in the holder. The invention is especially adapted for use in turret heads having provision for carrying a number of tools, for performing separate operations, and each of which tools are removably secured within the head by means of separate tool clamping means.

The object of the invention is to provide tool clamping means which may be easily operated, and which will quickly and efficiently respond to said operations in a manner to firmly clamp or release the shank of a tool when positioned therein.

With these and other objects in view, the invention resides and consists in the construction and novel combination and arrangement of parts hereinafter more fully described, illustrated in the accompanying drawings, and pointed out in the claims hereto appended, it being understood that various changes in the form proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a side elevational view of a modern type of tool slide mounted upon a cross-rail and carrying a turret head in which is embodied a number of my improved tool clamps;

Fig. 2 is an enlarged central vertical longitudinal sectional view through the turret head and a tool holder at one side of the lower tool holder and inclined at an angle to the vertical plane through the turret axis, taken on line 2—2 of Fig. 1;

Fig. 3 is a horizontal cross-section of Fig. 2, taken on line 3—3; and

Fig. 4 shows a detached perspective view of the movable wedge shaped clamping members shown in Figs. 2 and 3.

Referring in detail to the characters of reference marked upon the drawings, 6 represents a cross-rail of a modern type of lathe; 7 a saddle adjustably mounted thereon; 8 a tool slide mounted for vertical movement in the saddle, and 9 a turret head that is mounted upon the tool slide and adapted to be rotated upon and with respect to the slide by means of the handle 10 and secured in such adjusted positions by means of the handle 11. In the operation of this turret head the same is positioned and secured so that one of its tools will, with each operation, be brought to the bottom and disposed in a vertical position, for operation upon the work positioned below.

Turrets of this type may obviously be constructed to carry any desired number of tools, the one herein shown being designed for five, which is a desirable number for the class of machine for which it has been designed. The five tool sockets are positioned radially within the head and are arranged at equal distances apart. They are alike in construction, thus adapted to be similarly and independently operated by the manipulation of a single nut or screw. The turret head or other member, not shown, in which the tool is to be secured is provided with a bore or socket indicated herein as 12, to receive a cylindrical sleeve 13 that is split longitudinally as at 14 better to allow of its contraction and expansion within the bore. In practice, this sleeve serves to receive the shank of a tool 15 when positioned therein, and is adapted to directly engage and clamp the tool when the clamping members are operated. In this connection it will be seen that a pin 13$^a$ is positioned crosswise in the bottom end of the socket to position the bushing slot 14 in relation to the wedges and to be engaged by a cross-slot in the end of the tool shank when inserted into the socket of the holder.

The clamping members are positioned in a transverse opening 16 that intersects with the bore 12 and thus extends from front to rear through the turret head. The clamping members, when associated as shown in Figs. 3 and 4, form a unit that is adapted for adjustable movement within the opening 16 and held within the turret only by means of its engagement with the split sleeve 13 which it is designed to operate upon. These clamping members include an elongated block 17 having one flat side 18 for positioning against the side wall 19 of the opening 16 in which it is positioned, and further includes inclined top surfaces 20 and 21 upon which the relatively flat wedge-like members 22 and 23 slidably operate.

One of these wedges may be made longer than the other and they are each provided with a straight inclined surface to engage with and operate upon the surfaces 20 and 21 of the block 17 so that as the said wedges are drawn together, they are raised, and their concaved or tapered top portions 24 and 25 are brought to bear more tightly upon the peripheral surface of the sleeve. These wedges are provided with aligned holes 26 and 27 to receive a screw 28, the head 29 of which is seated in a socket 30 of the innermost wedge 22. The outer projected end of this screw is threaded to receive the clamping nut 31 by means of which the wedges are drawn together with the tightening of the nut. By this means it will be seen that the assembled wedges and screw are susceptible of slight longitudinal movement better to engage and release the sleeve.

It will be obvious of course that the position of this screw may be reversed and its threaded end made to engage a tapped hole, not shown, in the wedge 22 and its headed end exposed upon the outer surface of the wedge 23 whereby the screw may be turned and the wedges drawn together to the same effect as above described. By this means it will be obvious that a very much more efficient and quicker acting clamp is provided, than where the co-acting clamping members are caused to move against a straight flat surface, as is shown in my earlier patent No. 992,429.

Having thus described my invention, what I claim and desire to secure by Letters Patent is:—

1. In a tool clamp of the class described, the combination with a head having a tool socket therein, an opening intersecting the socket and including inclined surfaced means on the side opposite the socket, a pair of aligned wedges within the socket mounted to slide upon the inclined surfaces and having aligned holes therein, and an adjusting screw within said aligned holes for operating the wedges toward and from each other.

2. In a tool clamp of the class described, the combination with a head having a tool socket therein, an opening extending crosswise of and intersecting the socket, a block within the opening having inclined surfaces on one side, a pair of aligned wedges within the socket having inclined surfaces to slide upon the inclined surfaces of the block and having aligned holes, and an adjusting screw within said aligned holes for operating the wedges toward and from each other.

3. In a tool clamp of the class described, the combination with a head having a tool socket therein, an opening extending crosswise of and intersecting the socket, a block within the opening having inclined surfaces on one side, wedges having inclined surfaces to engage those of the block, and a clamping screw for operating the wedges toward and from each other.

4. In a tool clamp of the class described, the combination with a head having a socket to receive a tool and an opening extending crosswise of the socket, a pair of aligned relatively flat wedges arranged within said opening and crosswise of said socket, said wedges each having a flat top side that aligns with that of the other and a transverse concaved surface, each of said wedges also having inclined under surfaces, and a clamping screw for operating the wedges towards and from each other.

Signed at Bridgeport, in the county of Fairfield, and State of Connecticut, this 25th day of April, A. D. 1930.

EDWARD P. BULLARD.